Oct. 31, 1950          C. S. HAZARD          2,527,677
AUTOMATIC REGISTERING AND METERING SYSTEM
Filed Nov. 27, 1945          2 Sheets—Sheet 1
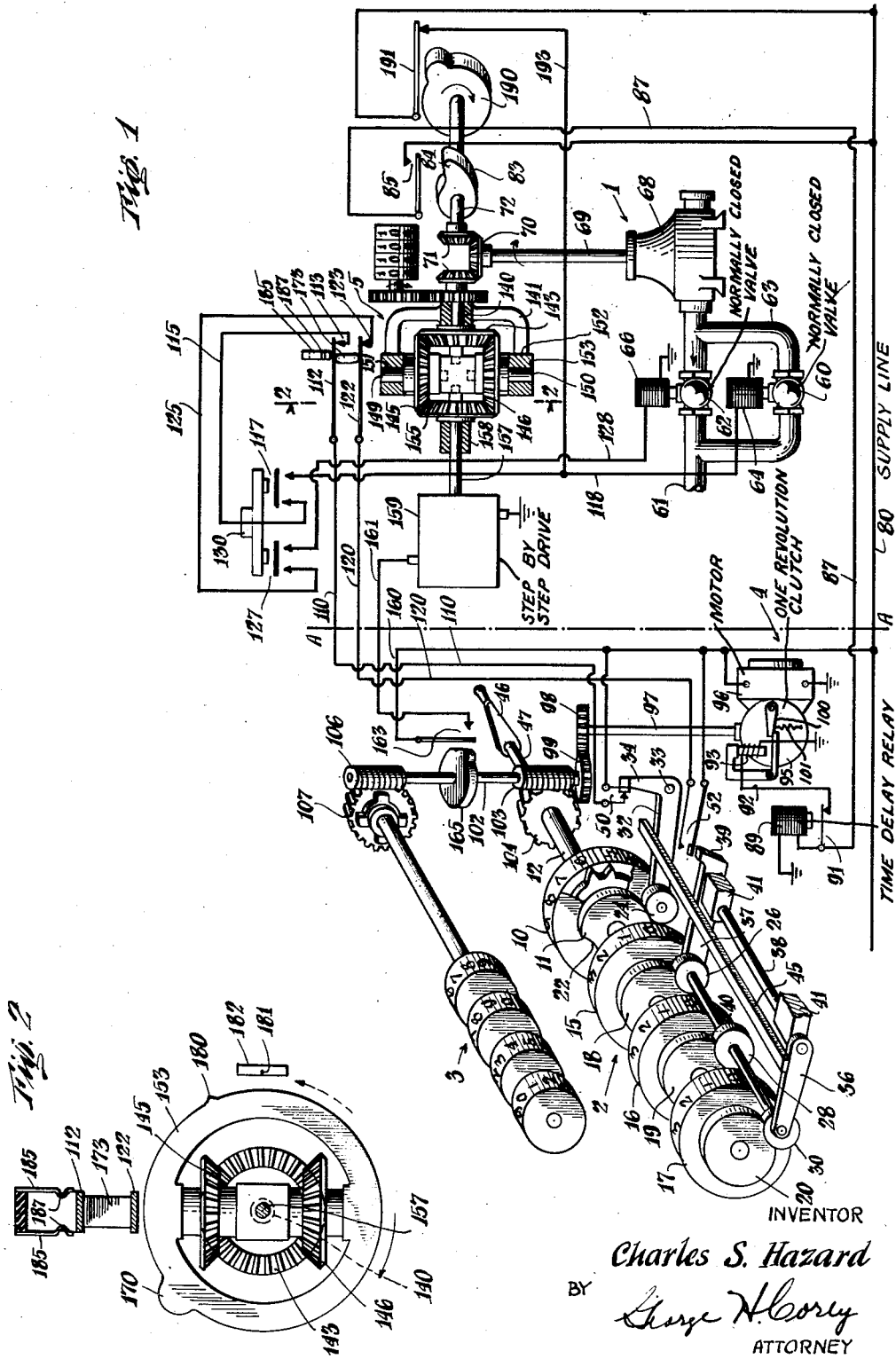
INVENTOR
Charles S. Hazard
BY
George H. Cory
ATTORNEY Oct. 31, 1950      C. S. HAZARD      2,527,677
AUTOMATIC REGISTERING AND METERING SYSTEM
Filed Nov. 27, 1945      2 Sheets—Sheet 2
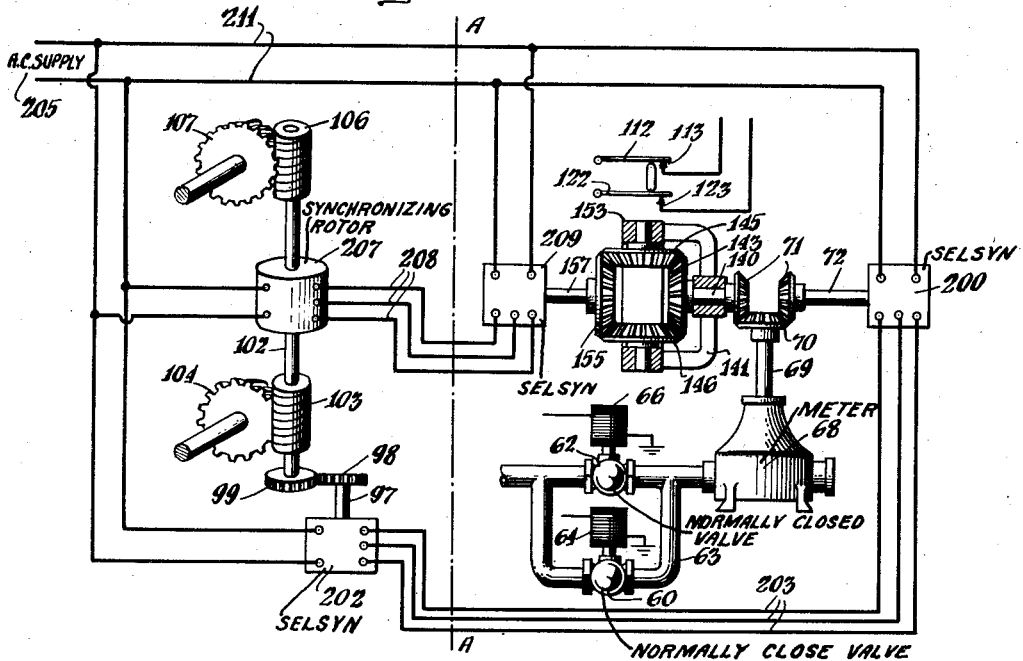
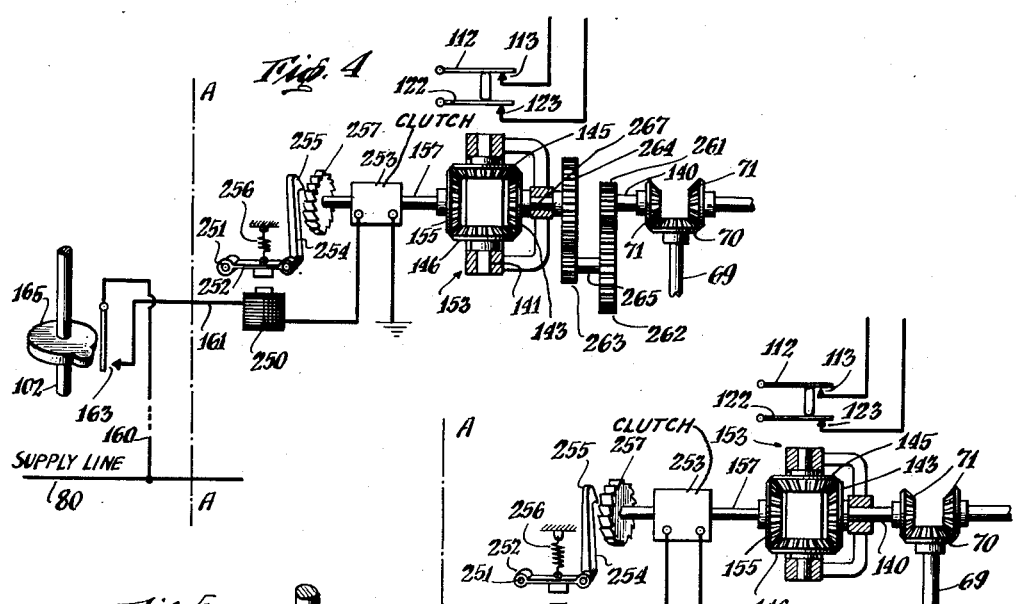
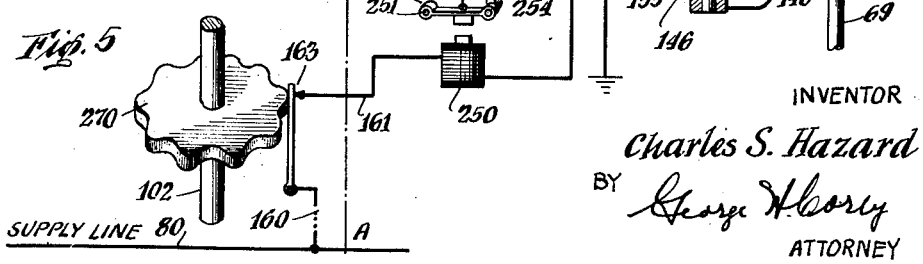
INVENTOR
Charles S. Hazard
BY George H. Corey
ATTORNEY Patented Oct. 31, 1950

2,527,677

UNITED STATES PATENT OFFICE 2,527,677

AUTOMATIC REGISTERING AND METERING SYSTEM

Charles S. Hazard, New York, N. Y., assignor to Neptune Meter Company, a corporation of New Jersey Application November 27, 1945, Serial No. 631,050

16 Claims. (Cl. 222—20)

This invention relates to apparatus for controlling the operation of a plurality of devices which are intended to operate concomitantly or in a predetermined relation, each with respect to the other, and for preventing improper operation of said devices. The invention is especially adaptable for controlling apparatus utilizing devices for measuring and for registering and recording the measurement of material to be delivered or dispensed.

The invention in its adaptation to apparatus of this type, for example to dispensing apparatus in which the registering and recording devices are more or less remote from the measuring device or from the point at which the material is delivered or dispensed, is particularly concerned with the problem of insuring proper coordination in the operations of a given device, such as the measuring device or meter, on the one hand and of another device, such as the registering and recording apparatus, on the other hand.

In dispensing apparatus and systems for controlling the measurement of the material being dispensed and securing a registration and a record of the amount of material dispensed an operative connection is necessary between the measuring device or meter and the register so as to operate the register concomitantly with the operation of the meter and also to stop the registration upon stopping of the meter when the desired amount of material has been dispensed. In the dispensing of fluids, such as gasoline and other oils, for example, heretofore a connection has been provided between the fluid meter and the register to drive the register upon operation of the meter through which the fluid is delivered under control of a valve. Registers of the auto-stop type also have been used operatively connected to the valve to control the valve and settable to an amount of the fluid desired to be dispensed. Such an auto-stop register ordinarily operates to shut the valve upon return of the auto-stop to the zero position, that is, upon completion of the registration of the amount desired to be dispensed.

In the application of Hazard and Shipman, Serial No. 448,644, filed June 26, 1942, there is disclosed dispensing apparatus suitable for fluids, such as gasoline or other oils in which means is provided which is actuated by the meter and is connected to driving means for effecting registering operation of the register and, as well, operation of an auto-stop register from the position to which it is set corresponding to an amount of the fluid to be dispensed to return the auto- stop to zero position. Means also is provided which is actuated by the auto-stop register and is connected to a valve which controls flow of the fluid through the meter and which is effective to maintain this flow when the auto-stop is in any setting position other than its initial position, the valve being conditioned for closing when the auto-stop has again reached its initial or zero setting position.

In the system disclosed in said application Serial No. 448,644 the means which is actuated by the meter to control driving of the registers includes an electrical contact intermittently closed in a predetermined relation to the operation of the meter to energize the means which drives the registers so as to effect step by step operation thereof. The construction and co-operation of the devices utilized is such that the register is actuated to register a unit of measurement upon operation of the meter effected by passage therethrough of one unit of the fluid being dispensed.

The auto-stop in the system of said application operates a contact at the completion of all but ten units registered, this contact being connected in a circuit with electrically energizable means for operating a valve in a conduit conducting the fluid being dispensed to said meter. The auto-stop also actuates a contact to close a circuit through an auxiliary electrically energizable means for operating an auxiliary valve in parallel with said first valve at the completion of registration of the last unit of measurement by said registers. This auxiliary electrically energizable means also is controlled by a contact actuated intermittently by the meter during its metering operation which is effective to maintain the auxiliary valve in open position except at intervals corresponding to completion of each full unit of measurement by the meter. The auto-stop register is effective to maintain this auxiliary valve open until it returns to its zero position but thereupon releases its control of said valve. The contact actuated by the meter, however, is arranged to take over control so as to maintain this auxiliary valve open after the auto-stop returns to zero and to close this auxiliary valve precisely upon completion of the last unit of measurement of the fluid which flows through the meter. The fluid dispensed under the controls provided by the system of said application Serial No. 448,644, therefore, is delivered only in full units of measurement in accordance with the setting of the auto-stop register.

All such dispensing apparatus and systems, whether the dispensing point or loading station is more or less remote from the registers and whether or not the operative connections therebetween are readily accessible, may become inoperative or incorrectly operated because of the failure of such connection or of parts of the apparatus involved in the transmission of motion or energy in either direction between the register and the measuring device or meter. Systems providing electrical transmission, as in that which is disclosed in said application Serial No. 448,644, are advantageous because of their flexibility as to the arrangement and location of the registers and meters and of the delivery controlling means, as well as because of the simplicity and availability of the devices for accomplishing the control and for energization of means for operation of the parts, especially when these parts are at a remote point from the delivery controlling means. Failure of operation may occur in electric systems due to breakage of wires, failure of contacts or of motors as well as of the mechanical devices utilized.

It is desirable in any such system to make provision to insure proper operation thereof or to prevent improper operation or failure to operate when a portion of the system, a connection or a part becomes defective or inoperative. It is an object of the invention, therefore, in a system comprising a plurality of devices and connections between these devices for normally effecting operation of a given device concomitantly with operation of another device to provide for controlling the operation of the devices or to shut down the system when such improper operation occurs.

It is another object of the invention to provide in a dispensing apparatus a system which will automatically operate to discontinue delivery of the material being dispensed upon the occurrence of any improper operation caused by any defective connection or any defective part of the system.

It is a further object of the invention to provide what may be called a "repeat back" connection from the register to the loading station which affords a mutual interaction of parts which is utilized to indicate faulty operation or to shut down the system upon the occurrence of such faulty operation.

It is a still further object of the invention to provide an electrical transmission system for transmitting to the register from means under control of the meter the energy for operating the register concomitantly with operation of the meter and to transmit back from means under control of the register energy to operate means which is also operatively connected to the meter to cooperate therewith for indicating improper operation of any portion of the system or for actuating means for shutting down the system upon occurrence of such improper operation.

Although the invention is not limited to the dispensing apparatus and system disclosed in said application of Hazard and Shipman Serial No. 448,644, it will be hereafter described in connection with such an apparatus and system. As in the apparatus and system of said application, the invention may utilize means which are intermittently actuated by the meter at intervals corresponding to each unit of measurement of the fluid delivered through the meter for effecting step by step operation of the registers, including an auto-stop register, to integrate and register the amount of fluid which passes through the meter and to cause the auto-stop register to return from a position to which it has been set to its zero position. The invention also may utilize a connection or connections controlled by the auto-stop register which are effective when the auto-stop register is in a position of setting other than its zero position to cause delivery of material through the meter, for example, by means of solenoids operating to open valves biased to closed position and controlling flow of the fluid through the meter.

It is a feature of the invention that means is provided which operates concomitantly with the meter and which also operates concomitantly with operation of the register, this means being effective to indicate departure from the normal operation of the apparatus or to control or to stop the dispensing operation. This concomitant operation may be an intermittent or step by step operation effected by the step by step operation of the register which, as above stated, itself is produced under the control of means intermittently actuated by the meter or the concomitant operation of register and meter may be continuous. The means which operates cooperatively with the meter is operatively connected thereto and, as well, to the register so as to be responsive to operations of the meter and of the register which are not concomitant with each other, or which are not in step with each other, as the case may be. This means and this operative connection may have the characteristics of a differential drive mechanism, such as may be provided in differential gearing, between the meter and a member driven by the register so that when one departs from its normal operation concomitantly or in step with the other differential movement of the mechanism is brought about. This differential movement may be utilized to actuate means which controls the valve or valves to effect closure thereof, thus to control or to stop delivery of the fluid being dispensed through the meter.

In the preferred embodiment of the invention the means which is responsive to operation of the meter and of the register actuates electrical means connected in a circuit which also normally is under control of the register. The differential gearing, for example, may be arranged to operate electrical contacts which are in series with those operated by the auto-stop. The solenoids or other electrically energizable means utilized for opening the valves against their bias may thus be deenergized to close the valves when such differential action occurs.

The apparatus and controls of the invention are adaptable to the system disclosed in said application Serial No. 448,644 which utilizes also means intermittently actuated by the meter and connected to said valves or to one of them for maintaining the flow of the fluid through the meter, after the system has otherwise been conditioned for closing said valve or valves, until completion of the last unit of measurement by said meter. This means insures that delivery is effected in full units of measurement of the material being dispensed even though the delivery is interrupted upon the occurrence of some improper operation detected by the apparatus and control system which are the subject of the invention.

Other objects and features of the invention will be understood from the description of the drawings to follow in which:

Fig. 1 shows a schematic arrangement of the apparatus of the invention;

Fig. 2 is a section on line 2—2 of Fig. 1;

Fig. 3 shows a modification of the portion of the apparatus of Fig. 1 which includes the differential drive and parts related thereto;

Fig. 4 shows another modification of the parts associated with the differential drive; and Fig. 5 shows a modification of the device of Fig. 4.

In Fig. 1 the meter and the valves for controlling flow of fluid therethrough which may be located at the loading station are indicated generally by the numeral 1. The auto-stop register is indicated by the numeral 2, the integrating register by the numeral 3 and the drive for these registers by the numeral 4. At 5 schematically is shown the differential drive and the parts relating generally thereto which are responsive to operation both of the meter and of the register.

The auto-stop register is shown with the units wheel 10 having a disk 11 rotating therewith mounted on sleeve 12. This auto-stop register also includes numeral wheels 15, 16 and 17 having disks 18, 19 and 20 respectively rotating therewith. The disk 11 is provided with a notch 22 for receiving the roller 24 carried by the horizontally extending arm 32 of the bell crank pivotally supported at 33, said bell crank having an upwardly extending arm 34. The disks 18, 19 and 20 also have notches respectively for engaging rollers 26, 28 and 30 carried on rod 40 extending between arms 36 and 37, these arms being fastened upon the shaft 38 supported in bearings 41. The arms 36 and 37 and the rod 40 and shaft 38 provide a rigid frame which is capable of pivotal movement in the bearings 41 to move all of the rollers 26, 28 and 30 out of the recesses in the corresponding disks 18, 19 and 20 when any one of these rollers is moved out of its recess by camming action of the respective disk.

Spanning across and fastened to the arms 36 and 37 and extending over upon the horizontal arm 32 of the bell crank 32, 34 is a bar 45. Upon camming action of any disk 18, 19, 20 producing pivotal movement of the frame consisting of arms 36, 37 and rod 40 and shaft 38, the arm 32 also will be depressed whether or not its roller 24 is cammed outwardly by disk 11 or is in register with the notch 22. In Fig. 1 the units wheel 10 is shown preset at five units, this presetting being accomplished in the conventional manner by means of the crank 46 carried on shaft 47 passing through sleeve 12. The tens wheel 15 and the wheels of higher order are shown in the zero position with the rollers 26, 28 and 30 in engagement with the respective recesses of disks 18, 19, 20. In this setting, or any setting other than zero, of wheel 10 roller 24 is in contact with the circumference of the disk 11 and holds the arm 32 depressed without the contact of the bar 45. Upon return of the units wheel 10 to zero position at the completion of the registration in a dispensing operation, the recess 22 returns to position in register with the roller 24 and roller 24 then enters the recess 22, the arm 32 moving upwardly and moving the arm 34 toward the right in Fig. 1.

When the arm 32 is depressed upon setting of the auto-stop to a position such as that shown in Fig. 1, the upwardly extending arm 34 moves to the left and closes contacts 50 which are connected in an electric circuit hereinafter described which controls the operation of the fluid control valve 60 by energizing and deenergizing the solenoid 64. The arm 37 also is provided with an upwardly extending portion 39 which upon depression of the arm 37 by camming of any of the rollers 26, 28 and 30 out of their respective notches by the disks 18, 19 and 20 in the setting of the auto-stop register moves the arm 39 upwardly and closes contacts 52 associated therewith, these contacts 52 being in an electric circuit hereinafter described for operation of the fluid control valve 62 by energizing and deenergizing the solenoid 66. The valves 60 and 62 preferably are biased to closed position and are opened upon energization of the respective solenoids 64 and 66. In the registering operation during delivery of the fluid when all of the wheels 15, 16, 17 have returned to zero from any setting corresponding to more than 10 units of measurement, being driven in such operation by the register drive 4 as hereinafter described, the arm 39 will be depressed to open the contacts 52 upon upward movement of the arm 37 concomitant with entry of the rollers 26, 28 and 30 into the respective recesses. Thereafter upon return of the units wheel 10 to zero and entry of the roller 24 into the recess 22, the contacts 50 will be opened. Thus first the circuit to the solenoid 66 is interrupted to close the valve 62 under its bias and thereafter the circuit to the solenoid 64 is interrupted to close the valve 60 unless this valve otherwise is maintained open as hereinafter described.

At the loading and metering station 1, the meter 68 is shown connected by pipe 61 and branch pipe 63 to receive the fluid passing through the valves 60 and 62. The internal construction of the meter is such that its vertical shaft 69 is rotated one revolution for each unit of measurement effected by the meter of the fluid flowing therethrough. In the particular embodiment illustrated in Fig. 1, the shaft 69 carries a bevel gear 70 meshing with bevel gears 71, one of which is carried on shaft 72 upon which also is mounted the cam 83. As in this embodiment the bevel gears 70 and 71 are of equal number of teeth, the cam 83 makes one revolution for each unit of measurement passing the meter 68. Arranged adjacent the cam 83 so as to be engaged by the toe 84 of said cam are contacts 85 which are operated to closed position by the cam 83 to close a circuit between the electric supply line 80 and the register drive 4 through the lead 87. The lead 87 connects to a time-delay relay 89 the armature-contact 91 of which also is connected to the lead 87 to control the circuit through lead 92 to the relay 93 for operating a one revolution clutch 95 which may be of conventional construction and operatively connected to motor 96 to be driven thereby. The motor 96 may be a constantly running motor connected between the supply line 80 and the ground as shown in Fig. 1 or may be provided with any suitable control. The clutch 95 is operatively connected to the vertical shaft 97, the upper end of which carries gear 98 meshing with gear 99 mounted on vertical shaft 102. In the particular embodiment being described, the gears 98 and 99 are of equal the number of teeth so that the vertical shaft 102 rotates one revolution for each revolution of the shaft 97, that is, for each revolution of the clutch 95. The vertical shaft 102 carries a worm 103 meshing with worm gear 104 mounted on the sleeve 12 of the auto-stop 2 to drive the auto-stop in registering operation from a position of setting to the zero position. At the same time through worm 106 mounted on the upper end of shaft 102 and worm gear 107 operatively connected to the register 3 in conventional manner, the register 3 is driven in registering operation concomitantly with the operation of the auto-stop register.

As the shaft 72 and cam 83 rotate one revolution for each unit of measurement effected by the meter, the one revolution clutch 95 will be energized once for each such unit of measurement of the fluid passing the meter. The ratio of the worms 103 and 106 respectively to the worm gears 104 and 107 may be such, in consideration of the conventional operative connections from the worm gears 104 and 107 to the respective registers 2 and 3, that the units wheels of the registers, for example, the units wheel 10 of the auto-stop register will be rotated $\frac{1}{10}$ of a revolution, that is, from one numeral to another on these numeral wheels. The time delay relay 89 is so adjusted as to continue the energization of the relay 93 to actuate lever 100 of clutch 95 so as to operate the clutch 95 sufficiently to produce one revolution only of the shaft 97 and then to open the contact 91 to deenergize the relay 93 and stop rotation of the shaft 97 and of the shaft 102, the spring 101 connected to lever 100 returning the lever 100 to inactive position. The contacts 85 meanwhile have been opened by continued rotation of the cam 83 to move the toe 84 thereof out of engagement with the movable contact 85. When again contacts 85 are closed upon completion of a revolution of the shaft 72, that is, of a unit of measurement of the meter, an impulse again is transmitted through the wire 87 to energize the time-delay relay 89 and operate the clutch 95 to drive the registers as above described. It thus will be apparent that the registers are operated by the meter in step-by-step manner concomitantly to register one unit of measurement for each unit of measurement of the fluid flowing through the meter and that the impulse for producing the drive of the meter is sent intermittently and only once for each unit of measurement under the control of the meter itself.

When the contacts 50 which are actuated by the vertically extending arm 34 controlled by the disk 11 of the units wheel 10 of the auto-stop register 2 are closed they establish a connection from the supply line 80 through lead 110 to a movable contact 112 associated with fixed contact 113. This circuit is continued through wire 115 and hand operated switch 117 and wire 118 to the solenoid 64 for operating the valve 60. Similarly, the contacts 52 which are actuated by the tens wheel and wheels of higher order of the auto-stop register control the connection from the supply line 80 through the lead 120 to movable contact 122 associated with fixed contact 123 which in turn is connected through lead 125 and hand operated switch 127 and lead 128 to the solenoid 66 which operates the valve 62. The contacts 112 and 122 are biased to closed position with the respective contacts 113 and 123 so that upon closing of the hand-operated switches 117 and 127, which may be accomplished simultaneously by means of the member 130, the circuits are established to energize the solenoids 64 and 66 when both contacts 50 and 52 both are closed by setting of the auto-stop register as above described for an amount greater than ten units. If only the contact 50 is closed by such setting, then only the solenoid 64 will be energized to open the valve 60 for dispensing an amount of fluid ten units or less. The contacts 112 and 122 are actuated by means hereinafter described and serve to open the circuits to the respective solenoids 64 and 66 whenever a condition arises in which the metering of the fluid by the meter is proceeding without being in exact correspondence with the operation of the auto-stop register and of the integrating register. These contacts also will be opened whenever a condition arises in which the means of transmission of the impulses to drive the register concomitantly with the operation of the meter fail properly to effect such transmission.

The means for opening the contacts 112 and 122 is shown generally at 5 in Fig. 1 and also in part in enlarged detail in Fig. 2. This means in the embodiment shown comprises a set of differential gears operatively connected through gears 70, 71, Fig. 1, to be driven by the meter 68. The left-hand one of the gears 71 is fastened upon shaft 140 which is rotatable in a yoke 141 itself suitably supported for rotation on the axis of shaft 140. On the shaft 140 also is fastened the bevel gear 143 of a set of differential bevel gears. The gear 143 meshes the gears 145 and 146 of the set which respectively are carried on stud shafts 149 and 150 which are rotatable in bearings 151, 152 carried by the ring 153 which is rigidly attached to the yoke 141. Meshing with gears 145, 146 is the bevel gear 155 carried on shaft 157 rotatably supported in bearing 158.

The shaft 157 may be driven by a suitable intermittently operating or step-by-step driving device 159 which, if desired, may operate in the same manner as the register drive 4 and may include a one-revolution clutch to effect one revolution of the shaft 157 at each actuation of the drive. This drive 159, as shown, is supplied through wires 160 and 161 and contact 163 normally open and closed by the actuation of cam 165 which is carried on the vertical register driving shaft 102. It will be understood from the description hereinabove given of the operation of the register drive 4 that since shaft 102 rotates one revolution for each revolution of meter shaft 69 the contact 163 in normal operation of the drive 4 will be closed by cam 165 once for each unit of measurement effected by the meter and for each unit of registration in the operation of the auto-stop register 2 and of the integrating register 3. Thus, an impulse will be given to the driving device 159 once for each unit of measurement and for each unit of registration so as to rotate the shaft 157 one revolution for each such unit. The bevel gear 155 of the differential gearing will be rotated one revolution for each unit of measurement of the meter, that is, for each revolution of the gear 71 and of the shaft 140 and of gear 143. In the particular embodiment being described the bevel gears 143 and 155 are of equal number of teeth. If, therefore, the shaft 140 is rotated in the direction of the arrow in Fig. 1, that is, counter-clockwise, when this shaft is viewed from the left, as in Fig. 2, and if also the driving device 159 drives shaft 157 to rotate clock-wise as viewed from the left in Fig. 1, then the gears 145 and 146 meshing with gears 143 and 155 merely rotate with their shafts in the bearings 151 and 152 respectively without causing rotation of the yoke 141 and ring 153 upon the shaft 140. This condition of operation of the differential device 5 will be maintained as long as the parts which are actuated by the meter 1, that is, the shaft 69, the gearing 70, 71, cam 83, contacts 85 connected through lead 87 to the relays 89 and 93 for operation of the clutch 95, are continued in operation concomitantly with operation of the parts which are driven by the register drive 4, that is, the shaft 97, gears 98, 99, shaft 102, cam 165 and contacts 163 connected to the intermittent drive 159 and shaft 157.

If, however, the meter fails to operate the shaft 69 in the required relation to the operation of the register, and particularly to operation of the shaft 102 which carries the worm gears 103 and 106 for driving the registers, so that the contacts 85 are not actuated in step with the contacts 163 to produce a full revolution of the gear 155 for each revolution of the gear 143, a differential motion occurs between the gears 143 and 155 through the gears 145 and 146 and this produces a rotation of the yoke 143 and ring 151 on the shaft 140. Such differential action, if continued so as to effect a substantial part of a revolution or a full revolution of the ring 151, serves to move the cam toe 170 attached to ring 153 into engagement with the contact 122 to disengage said contact 122 from the fixed contact 123 and to open the circuit from the auto-stop register contacts 52 to the solenoid 66, thus to close the valve 62. The contacts 122 and 112 are rigidly connected together by a suitable mechanical connector 173 so that, simultaneously upon opening of the contact 122, the contact 112 also is disengaged from contact 113 to open the circuit to the solenoid 64, thus to close the valve 60. Closing of these two valves stops the flow of the fluid to the meter.

It will be apparent also if the circuit to the register drive 4 is not properly completed, for example, if the contacts 85 are not closed by the cam 83 in regular intermittent operation, or if the cam slips on shaft 72 the register drive 4 will not be energized in corresponding step-by-step operation with the meter 68. The cam 165, therefore, will not be rotated in corresponding operation and the contacts 163 will not be closed in step with the rotation of the meter. The shaft 157 and the gear 155 mounted thereon, therefore, will not be rotated in step-by-step operation corresponding to the rotation of the meter and differential action will take place and rotation of yoke 141 and ring 153 to bring the cam toe 170 into position to open the contacts 122 and 112. Similarly, if a break should occur in any of the leads such as the lead 87 or the leads 160, 161 which serve to transmit the impulses in the first instance from the meter to the register drive, and in the second from the register drive back to the differential mechanism which also is driven by the meter, the differential action referred to will occur and the flow of the fluid being dispensed will be stopped.

The circuit through lead 161 controlled as above described in combination with the drive 159 and the differential mechanism 5 serves to "repeat back" the impulse originated under control of the meter which effects driving of the registers. As long as the impulses are in unison, the device for opening the circuit to the solenoids to stop the flow is ineffective to do so. Whenever the impulse initiated at the meter, however, is not repeated back to this device it becomes responsive to the discrepancy between the impulses which are transmitted to it through the register drive and the parts driven thereby and from the meter. This device thus responsive, that is, the differential 5 in the embodiment being described, then becomes effective to open the circuits to the solenoids 64, 66 and stop the flow as above stated. It also will be apparent that by providing a pointer 180, as shown in Fig. 2, which is carried by the ring 153 indication may be secured against a mark 181 or a scale carried on the fixed piece 182 of the movement of the differential device from a balanced condition into position to open the contacts 112 and 122 and shut the valves 60 and 62.

In order to prevent reopening of the valves 60, 62 and repeated closing in the event of the occurrence of some condition which produces the differential action and rotation of the yoke 141 and ring 153 repeatedly to bring the cam toe 170 into engagement with the contact 120, spring pieces 185 may be provided between which the contact member 112 may be gripped when pressed up between the bulges 187 in these spring pieces 185 by toe 170 so as to hold both contacts 112 and 122 out of engagement with the respective fixed contacts 113, 123. Once the cam toe 170 has come into engagement with the contact 122 and even though with continued rotation of the ring 153 the cam toe passes out of engagement with the contact 122, the valves 60, 62 will be maintained closed since the contacts 112, 113 and 122, 123 are held open to prevent renewed flow of the fluid until the fault in the system which caused the closing has been remedied.

Carried on shaft 72 a cam 190 may be provided which actuates to open position the normally closed contact 191 which is connected between the supply line 80 and the solenoid 64 through lead 193 to maintain the solenoid 64 energized until the completion of the last unit of measurement of the fluid being dispensed as above mentioned. This cam 190 is set on shaft 72 so as to just break the contact 191 at the completion of each unit of measurement effected by the meter. When the auto-stop register returns to zero and valve 62 has been closed, the solenoid 64 also would be deenergized to close valve 60 except that the solenoid 64 is maintained energized by the circuit through the contact 191 and lead 193 until the completion of the current unit, that is, the last unit of fluid being measured and dispensed. Upon the completion of this unit, the contact 191 is opened and the valve 60 is shut. Thus, whenever closing of the valves is effected either in the normal operation of the system or under some condition of improper operation which it is the purpose of the invention to detect and to provide for, the number of units of fluid which are actually dispensed will be full units corresponding to the setting of the auto-stop or to the units shown by the register at the time of interruption. The measurement will not be in units and a fraction as would be the case if the valve 60 were closed at the instant of the occurrence of some condition of improper operation which causes the contacts 112 and 122 to be opened by the cam toe 170 as above described.

In the apparatus as above described in connection with Fig. 1, the shaft 157 and the bevel gear 155 are moved intermittently one revolution at a time in order to correspond precisely with the intermittent actuation of the contacts 85 by the cam 83 under control of the meter. As the meter shaft 69 is continuously rotated in a conventional meter, the shaft 140 being likewise continuously rotated, a certain degree of differential action will occur between gears 143 and 155 and movement will take place in the ring 153 during the interval, which may be relatively short, in which the shaft 157 and the gear 155 are at rest while the gear 143 continues to rotate. When, however, the shaft 157 and the gear 155 are rotated under the impulse given by the cam 165 closing contacts 163, this movement of the ring 153 in whichever direction it occurs will be offset by movement thereof in the opposite direction because the gear 155 will have caught up with the gear 143. This results from the fact that in each period which is required for the passing of a unit of measurement of fluid through the meter, in consideration of the relation and the operative connections between the various parts of the apparatus or system, as above described, the shaft 157 between the intervals of rest makes one full revolution for each full revolution of the shaft 69 and of the shaft 140. To provide for such fractional rotation or "hunting" of ring 153 while avoiding actuation of the contacts 112 and 122, the cam toe 170 may be only of such width, that is, circumferentially of the ring 153, as shown in Fig. 2, that a substantial amount of rotation, even a large part of a revolution, of this ring may occur before the cam toe 170 is brought into engagement with the contact 122. Within one revolution of the ring 153, however, the cam toe 170 will engage the contact 122 so as to disengage this contact and the contact 112 from their respective fixed contacts 123 and 113, thus to close the valves 60 and 62.

While the "repeat back" system has been described above in the embodiment of the invention which is illustrated in Fig. 1 to produce intermittent rotation of the shaft 157 and of the gear 155 of the differential gearing corresponding to the rotation of the register drive shaft 102, within the scope of the invention the system shown in Fig. 3 may be used in which the shaft 157 is driven continuously concomitantly with the continuous rotation of the meter shaft 69 to effect continuous operation of the shaft 140. The devices, including the cam 83, contact 85, relays 89 and 93 and clutch 95 and motor 96, as shown in Fig. 1 are replaced by a set of self-synchronizing motors. One self-synchronizing unit 200 is arranged with its rotor mounted on the shaft 72 which is driven by the meter shaft 69 through the beveled gears 70, 71. The other unit 202 of the pair of self-synchronizing motors is arranged with its rotor mounted on the shaft 97 upon which is fastened, as in Fig. 1, the gear 98 meshing with the gear 99 to effect rotation of the shaft 102 and of the worm and gear drive 103, 104, as in Fig. 1. The units 200 and 202 are connected in the conventional manner by wires 203, these units also being connected in the usual manner in parallel to wires 211 of an alternating current supply at 205. As the rotor of the self-synchronizing unit 202 follows precisely the rotation of the rotor of the unit 200, the shaft 97 will rotate one revolution for each revolution of the meter shaft 69, the gears 70 and 71 being of equal size. As the gears 98 and 99 also are of equal size, the shaft 102 will rotate one revolution for each revolution of the meter shaft 69.

Mounted upon the shaft 102 is the rotor of the self-synchronizing unit 207 which is connected in the conventional manner to the companion unit 209 through wires 208. The units 207 and 209 are connected in parallel in the usual manner to the alternating current supply 205. The rotor of unit 209 is mounted on the shaft 157, so that for each revolution of the shaft 102 shaft 157 is rotated one revolution by the transmission of the power effected through the self-synchronizing units.

In Fig. 3 the differential mechanism which comprises the gear 155 mounted on shaft 157 and the gear 143 mounted on shaft 140 and the planetary gears 145 and 146 is supported in the ring 153 attached to the yoke 141 in the same manner as shown and described in connection with Fig. 1. The bevel gear 71 which is mounted on shaft 140, being of equal size with the bevel gear 70 on the meter shaft 69, effects rotation of the shaft 140 and of the gear 143 to produce the same number of revolutions of the gear 143 as of the gear 155, these gears rotating in opposite directions. In the normal operation of the apparatus, therefore, the ring 153 remains stationary and is ineffective to operate the contacts 112, 113 and 122, 123 which function in cooperation with the cam toe 170 carried by the ring 153 in the same manner as described in connection with Fig. 1.

If, however, some part of the device fails, so that either the energy is not transmitted from the meter shaft 69 to the register driving shaft 102, thus causing the gear 143 to continue to rotate while the gear 155 lags behind or is stopped, then the differential mechanism is effective to rotate the ring 153 to operate the contacts 112, 113 and 122, 123 in the same manner as described in connection with the Fig. 1 to effect closure of the valves 60 and 62 and shutting down of the apparatus. Correspondingly, if the energy fails to be transmitted from the register driving shaft 102 through the self-synchronizing units 207, 209 to the gear 155, the gear 155 will lag behind or stop and the system again will be shut down. Other conditions of failure likewise will shut down the system. It will be apparent, for example, that if the shaft 140 should brake, thus failing to rotate the gear 143 while the gear 155 is continued in rotation by the drive from the meter shaft 69 through the self-synchronizing units and the shafts 102 and 157, the differential mechanism will again be effective to rotate the ring 153 and operate the contacts 112, 113 and 122, 123 to shut down the system. As long, however, as the rotation of the meter in its metering operation is continuously transmitted to the register shaft 102 to effect continuous rotation of the register during such metering operation and, at the same time, the rotation of the register shaft 102 is effective to transmit energy to and continuously to rotate the shaft 157 and the gear 155 the ring 153 remains stationary and the contacts 112, 113 and 122, 123 remain closed. The solenoids 64 and 66 thus may remain energized when the auto-stop register is in a position of setting other than its initial or zero position by closure of the hand-operated switches 117 and 127 as shown in Fig. 1.

It will be observed that the invention as shown and described in connection with Figs. 1 and 3 affords a continuous comparison of the operation of the register with the operation of the meter by providing means which effect a continuous gauging or testing of the concomitant operation of the meter and of the register in the proper relation. It also provides means which prevents improper operation. The invention thus broadly provides apparatus for controlling operation of a plurality of devices which are intended to operate concomitantly with each other, operation of a given one of the devices being effected by an operative connection from another of the devices. The control apparatus of the invention comprises means cooperatively actuated by both of the devices so as to be responsive to departure of any one of said devices from the normal concomitant operation. The cooperatively actuated means may control the operation of the devices, and also may control the delivery of the material being dispensed in the adaptation of the invention to a dispensing system in which these devices are utilized.

In Fig. 4 is shown another modification of the means which is driven from the register to effect driving of the shaft 157 and of the differential gear 155. In this modification the impulse is sent from the supply line 80 through the wires 160 and 161, as in the embodiment in Fig. 1, when the contacts 163 are closed by the cam 165. The wire 161 is connected to solenoid 250 in series with an electro magnetic grip or lock 253 arranged on shaft 157 and thence to ground. Thus the solenoid 250 becomes energized once in each rotation of the cam 165 and of the register drive shaft 102. Pivotally supported at 251 is an armatured lever 252 to which at its outer end is pivotally attached the pawl 254 having a hooked end 255 for engagement with a ratchet 257 fastened on shaft 157, which shaft is suitably supported for rotation when the ratchet is actuated by the pawl 254. It will be apparent that the pawl 254 will be drawn downwardly for each energization of the solenoid 250, that is for each impulse transmitted by the cam 165 corresponding to a unit of measurement effected by the meter transmitted through the register drive 4. This pawl 254 and lever 252 are biased by spring 256 to the upper position to which they return upon deenergization of solenoid 250. The grip 253 is constructed so as to release the shaft 157 when its coil is energized and is actuated by bias means to grip the shaft when its coil is deenergized upon opening of contacts 163.

The ratchet 257 preferably is provided with a number of teeth which is not less than is consistent with practical construction but such that for each stroke of the pawl 254 as great a part of a revolution of the shaft 157 will be produced as is possible. Assuming, for example, that there are ten teeth in the ratchet 257, then the shaft 157 is rotated $\frac{1}{10}$ of a revolution for each impulse transmitted by the cam 165, that is, for each unit of measurement by the meter. The gear 155 of the differential gearing constructed as described in connection with Fig. 1, therefore, is rotated only $\frac{1}{10}$ of a revolution for each unit of measurement, that is, for each revolution of the vertical meter shaft 69 and of the shaft 140. Continued differential movement of ring 155, therefore, would occur if the gear 143 were directly driven by shaft 140. In order to produce only $\frac{1}{10}$ of a revolution of the shaft 267 and of the differential gear 143 mounted thereon to correspond with the movement of the gear 155 in each unit of measurement completed by the meter, a train of speed reduction gears 261, 262, 263, 264 is provided, gears 262, 263 being mounted on side shaft 265, with pinion 261 mounted on shaft 140 which carries bever gear 71 driven by the gear 70 on the meter shaft 69 and with gear 264 mounted on shaft 267 to rotate therewith to drive bevel gear 143. The ratios of the gears 261 and 262 and of the gears 263 and 264 may be such that the shaft 267 is rotated only $\frac{1}{10}$ revolution for each full revolution of the meter shaft 69, gears 70 and 71 being equal. The apparatus of Fig. 4 thus accomplishes rotation practically in unison of the parts of the differential drive which are driven respectively from the meter and register although in the short intervals in which gear 155 is stopped between impulses received by the ratchet a slight "hunting" occurs.

The number of teeth in the ratchet 257 and the ratio of gears 261, 262, 263, 264 may be varied to suit different conditions and other types of electrical or mechanical devices may be adapted for converting movement of translation to movement of rotation which will secure rotation of the shaft 157 for each impulse transmitted by the cam 165 which is concomitant with operation of the meter.

The electromagnetic grip or lock 253 may be provided in any construction embodying the invention in which the shaft 157 is intermittently rotated. The grip is effective to stop rotation of shaft 157 immediately upon completion of the rotation or partial rotation of shaft 157 produced by means such as the pawl 254 and ratchet 257 actuated by the solenoid 250. The shaft 157 and gear 155 thus are held stationary and are not subject to rotation by the meter through the reduction gearing and the differential gearing above described which are continuously rotated by the meter. Where, however, as in Fig. 1, the driving device 159 utilizes means, such as a one revolution clutch, which itself acts to lock the driven shaft 157 in the interval between the rotational movements the electromagnetic lock 253 is not required.

In Fig. 5 is shown a modification of the device represented in Fig. 4. In Fig. 5 like parts are identified with the same numerals as in Fig. 4 and the device of Fig. 5 operates in the same manner as that of Fig. 4 except that for the single lobe cam 165 of Fig. 4 is substituted a cam 270 having ten lobes. The cam 270 actuates contacts 163 to close the circuit between the supply line 80 and the ground through the wires 160 and 161 and solenoid 250 and the magnetic grip 253 as described in connection with Fig. 4. As the cam 270 has ten lobes, in one revolution of the shaft 102 on which it is mounted it will close the contacts 163 and energize the solenoid 250 ten times in each revolution of the shaft 102, that is, ten times in each revolution of the meter shaft 69. Since for each energization of the solenoid 250 the ratchet 257 having ten teeth is rotated $\frac{1}{10}$ of a revolution, it will be apparent that in the embodiment of Fig. 5 the shaft 157 and gear 155 mounted thereon are rotated one revolution for each revolution of the shaft 102 and, therefore, for each revolution of the meter shaft 69. The shaft 140 upon which one of the gears 71 is mounted may therefore be directly connected to the gear 143 of the differential mechanism. As long as the shaft 157, although intermittently operated, is rotated through a complete revolution for each revolution of the meter shaft 69 the ring 153 will not be rotated to effect closure of the contacts 112, 113, and 122, 123 to shut down the system as described in connection with Fig. 1. A certain amount of "hunting" will occur between the actuations of the contact 163 for the reasons which have been described above but, as long as the circuits remain complete and the mechanical connections are maintained, the system will be maintained in operation in the manner prescribed in connection with Fig. 1. Upon failure of the circuit controlled by the cam 84 and contact 85 to supply energy to drive the register shaft 102, or upon failure of the circuit from the contacts 163 to the solenoid 250, or upon failure of other electrical or mechanical parts of the system which will cause either the gear 143 or the gear 155 to lag behind its normal rotation with respect to the other gear, the ring 153 will be set in rotation to operate the contacts 112, 113 and 122, 123 to shut down the system.

In Figs. 1, 3, 4 and 5 the vertical dot and dash line AA is shown for the purpose of dividing the schematic arrangements of the apparatus which normally is located adjacent the register or in an office in which the registers are located from the apparatus which normally is located at the loading station where the fluid is dispensed or adjacent the meter which is associated with a given loading station. Thus the leads or wires which traverse the vertical line AA substantially represent those which may be collected in a multiconductor cable extending from the register location to the loading station or meter location. It will be apparent, for example, that if a break in the wire 80 or 87 in this cable should occur, the connection between the contacts 85 and the drive 4 would be broken and the cam 165 then would fail to send the impulse to the driving device 159, Fig. 1, or to the solenoid 250, Figs. 4 and 5. Similarly a break in the lead 161 will interrupt transmission of the impulse to the driving device 159, Fig. 1, or to the solenoid 250, Figs. 4 and 5. A break in the wires 203 or 208 will cut the connection between the self-synchronizing units 200, 202 and 207, 209 respectively and a break in line 211 will interrupt the common supply of alternating current to these units, thus preventing their synchronous operation. Any of these occurrences and others will produce the differential operation described. If the ring 153 continues to rotate until the contacts 112, 113 and 122, 123 are opened by the cam toe 170 the dispensing operation will be stopped.

Within the scope of the invention various modifications may be made in the apparatus utilized and in its arrangement while providing for the transmission intermittently or continuously from the meter of an impulse corresponding to each unit of measurement of the fluid flowing through the meter to effect drive of the register and transmission back to the means which is responsive both to the meter operation and to the register operation of an impulse likewise corresponding to each unit of measurement registered by the register concomitantly with measuring of the unit by the meter.

I claim:

1. In a dispensing apparatus, the combination with a register, a measuring device for measuring delivery of material therethrough, and means for controlling delivery of material through said measuring device, of means operatively connecting said register to said measuring device for effecting registering operation of said register in accordance with measuring operation of said measuring device, means operatively connecting said register to said delivery controlling means normally during measuring operation to effect control of said delivery controlling means by said register, and means cooperatively actuated by said register and by said measuring device for stopping delivery of said material upon failure of said register to operate in accordance with measuring operation of said measuring device.

2. In a dispensing apparatus, the combination with a register, a measuring device for measuring delivery of material therethrough, and means for controlling delivery of material through said measuring device, of means operatively connecting said register to said measuring device for effecting registering operation of said register in accordance with measuring operation of said measuring device, means operatively connecting said register to said delivery controlling means normally to effect control of said delivery controlling means by said register to deliver material to said measuring device for measurement in amount in accordance with registering operation of said register, and means responsive to operation of said register and of said measuring device and operatively connected to said delivery control means to stop delivery of said material upon failure of said means operatively connecting said register to said measuring device and said means operatively connecting said register to said delivery control means to effect registering operation of said register and control of said delivery control means in accordance with measuring operation of said measuring device.

3. In a fluid dispensing apparatus, the combination with a presettable register, a fluid meter, and a valve for controlling flow of fluid through said meter, of means controlled by said meter and operatively connected to said register for effecting registering operation of said register concomitantly with operation of said meter, means controlled by said register and operatively connected to said valve normally operative to control operation of said valve to maintain said valve in open position in all setting positions of said register other than its initial position, and means operatively connected to said register and to said meter and to said valve and responsive to departure of said register and said meter from said concomitant operation thereof to effect closure of said valve in any setting of said register.

4. In a fluid dispensing apparatus, the combination as defined in claim 3 in which upon failure of any of said connections said means responsive to departure of said register and said meter from said concomitant operation thereof is effective to close said valve.

5. In a fluid dispensing apparatus, the combination with a presettable register, a fluid meter, and a valve for controlling flow of fluid through said meter, of means controlled by said meter and operatively connected to said register for effecting registering operation of said register concomitantly with metering operation of said meter, means controlled by said register operatively connected to said valve and normally during metering operation capable of maintaining said valve in open position in all setting positions of said register other than its initial position, means responsive to operation of said register and of said meter and operatively connected to said register controlled means for making said register controlled means ineffective to maintain said valve in open position upon failure of said means controlled by said meter to effect registering operation of said register concomitantly with metering operation of said meter, and means thereupon effective to close said valve and stop flow of said fluid.

6. In a fluid dispensing apparatus, the combination with a presettable register, a fluid meter, and a valve for controlling flow of fluid through said meter, of means operatively connecting said meter to said register for effecting registering operation of said register concomitantly with metering operation of said meter, means controlled by said register and means controlled by said meter both operatively connected to said valve to control operation thereof, said register controlled means normally during metering operation being capable of maintaining said valve in open position in all setting positions of said register other than its initial position, said meter controlled means normally during the metering operation being capable of maintaining said valve in open position except at intervals occurring only at the completion of each unit of measurement, said meter controlled means being effective to close said valve at said intervals whenever said register is in its initial position, and means responsive to operation of said register and of said meter and connected to said valve and cooperating with said meter controlled means to close said valve at the completion of the current full unit of measurement by said meter upon failure of said means for effecting registering operation of said register to be operated concomitantly with metering operation of said meter.

7. In a fluid dispensing apparatus, the combination with a register, a fluid meter, and a valve for controlling flow of fluid through said meter, of means controlled by said register and operatively connected to said valve normally to control operation thereof during registering operation of said register, means actuated by said meter at intervals in a predetermined relation to the metering operation of said meter and operatively connected to said register to effect step by step registering operation of said register concomitantly with metering operation of said meter, means actuated by said register at intervals in a predetermined step by step relation to said step by step registering operation of said register, and means responsive to variations in the actuation of said means actuated by said meter and said means actuated by said register relative to each other and operatively connected to said valve for closing said valve upon occurrence of such variations.

8. In a fluid dispensing apparatus, the combination with a presettable register, a fluid meter, and a valve for controlling flow of fluid through said meter, of means operatively connected to said register and intermittently energized under control of said meter for effecting step by step registering operation of said register concomitantly with operation of said meter, means controlled by said register and operatively connected to said valve normally during metering operation to maintain said valve in open position in all setting positions of said register other than its initial position, and a mechanism having a part operatively connected to said register and a part operatively connected to said meter, said parts being operatively connected to each other, said mechanism being responsive to variations in the operation of either of said parts relative to the other and effective to operate said valve upon the occurrence of a predetermined variation to make said register ineffective to control said valve and to effect closure of said valve in any setting of said register.

9. In a fluid dispensing apparatus, the combination with a register, a fluid meter, and a valve for controlling flow of fluid through said meter, of means controlled by said meter and operatively connected to said register to effect registering operation of said register concomitantly with metering operation of said meter, a device actuated by said register in registering operation thereof and by said meter in metering operation thereof and providing a differential connection between said register and said meter effective to produce differential operation thereof upon departure of said register and said meter from concomitant operation relative to each other, said device being operatively connected to said valve so as to effect closure thereof upon the occurrence of a predetermined differential operation of said device, whereby dispensing of fluid through said meter without concomitant registration thereof is prevented.

10. In a dispensing apparatus the combination with a register, a fluid meter, and a valve for controlling flow of fluid through said meter, of electrically energizable means for driving said register for registering operation thereof, a contact connected in an electric circuit with said electrically energizable driving means and actuated by said meter normally to effect registering operation of said register concomitantly with metering operation of said meter, electrically energizable means for operating said valve, a contact connected in an electric circuit with said electrically energizable valve operating means and actuated by said register normally to connect said register to said electrically energizable valve operating means to hold said valve open during registering operation of said register, a differential mechanism having a part operatively connected to said register and a part operatively connected to said meter and providing for differential movement of one relative to the other, said operative connection of said part connected to said register comprising a contact actuated by said register and connected in an electric circuit with an electrically energizable means for operating said part of said differential mechanism connected to said register, and means operatively connecting said differential mechanism to said valve for effecting closure of said valve upon the occurrence of differential movement of one of said parts relative to the other, whereby dispensing of said fluid without concomitant operation of said meter and said register is prevented.

11. In a dispensing apparatus the combination as defined in claim 10 which comprises a contact connected in an electric circuit with said electrically energizable valve operating means normally during metering operation to energize said electrically energizable valve operating means and actuated by said meter at intervals upon the completion of each unit of measurement by said meter during metering operation thereof so as to deenergize said valve operating means unless energized by said contact actuated by said register, whereby said valve is maintained open until the completion of the current unit of measurement by said meter whenever said differential mechanism operates to close said valve and thereupon said valve is closed.

12. Apparatus for controlling the operation of a plurality of devices concomitantly with each other which comprises means actuated by a given one of said devices in its operation and operatively connected to another of said devices normally to effect operation thereof concomitantly with the operation of said given device, and means cooperatively actuated by both said devices so as to be responsive to departure of one of said devices from said normal operation concomitantly with the other of said devices for controlling the operation of said devices.

13. In apparatus for registering the measurement of a quantity of a flowing material, the combination with means for measuring the amount of the material as it flows, and means for registering the amount of the material measured, of means actuated by said measuring means in its measuring operation and operatively connected to said registering means normally to effect operation of said registering means concomitantly with the operation of said measuring means, and means cooperatively actuated by said registering means and by said measuring means and responsive to departure of said registering and measuring means one with respect to the other from said concomitant operation thereof for controlling operation of said measuring means and said registering means.

14. In the combination as defined in claim 13, means actuated by said means cooperatively actuated by said registering means and by said measuring means for controlling the flow of said material.

15. In apparatus for registering the measurement of a quantity of a flowing material, the combination with a device for measuring the amount of the material as it flows, and a register for registering the amount of the material measured, of means actuated by said measuring device in its measuring operation and operatively connected to said register normally to effect operation of said register concomitantly with the operation of said measuring device, means actuated by said register concomitantly therewith, auxiliary means actuated by said measuring device concomitantly therewith, and means operatively connected to said auxiliary means and to said means actuated by said registering so as to provide for differential movement of one relative to the other upon departure of said register and of said measuring device from concomitant operation one with respect to the other and effective upon such departure to control the flow of said material.

16. In the combination as defined in claim 15, means responsive to operation of said means providing said differential movement of said auxiliary means actuated by said measuring device and said means actuated by said register for stopping flow of said material upon departure of said register and said measuring device from said concomitant operation.

CHARLES S. HAZARD.

REFERENCES CITED

The following references are of record in the file of this patent:

UNITED STATES PATENTS

| Number | Name | Date |
|---|---|---|
| 1,922,071 | Bassett | Aug. 15, 1933 |